May 8, 1951  C. A. DE GIERS ET AL  2,551,792
GAUGE FOR INDICATING WEIGHT OF LIQUIDS IN TANKS
Filed July 30, 1948  2 Sheets-Sheet 1
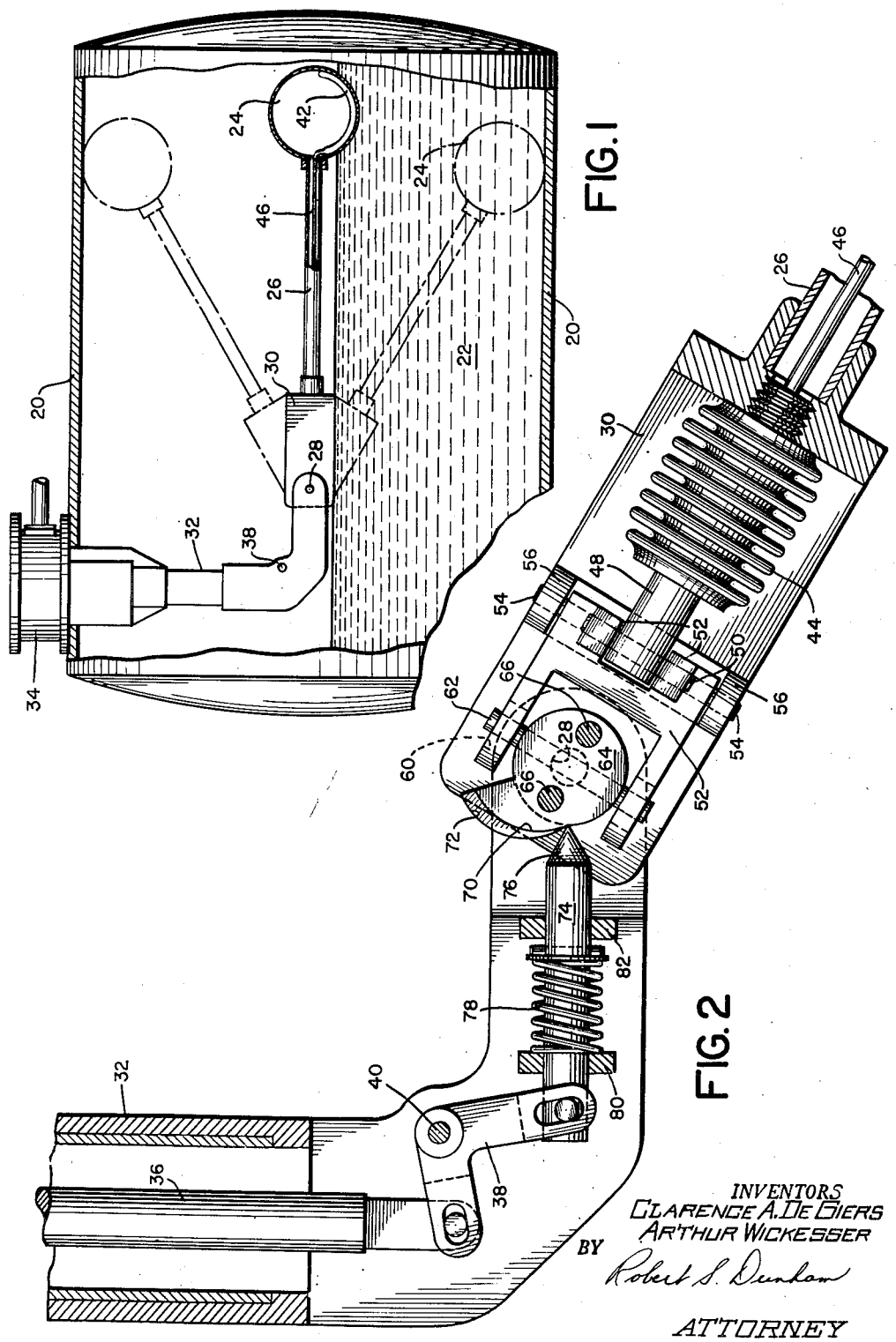
INVENTORS
CLARENCE A. DE GIERS
ARTHUR WICKESSER
BY
Robert S. Dunlap
ATTORNEY

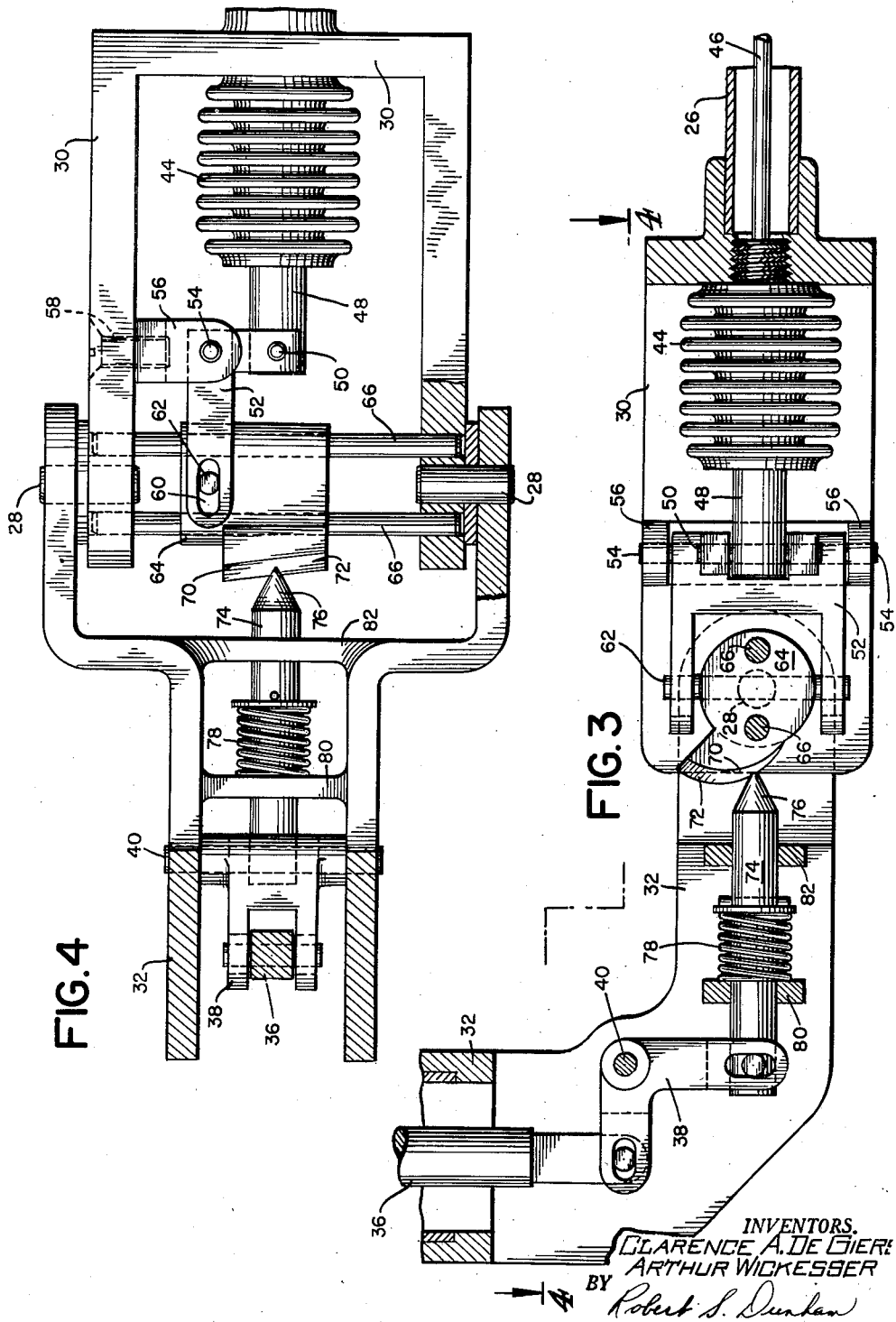

Patented May 8, 1951

2,551,792

UNITED STATES PATENT OFFICE 2,551,792

GAUGE FOR INDICATING WEIGHT OF LIQUIDS IN TANKS

Clarence A. de Giers, Forest Hills, and Arthur Wickesser, St. Albans, N. Y., assignors to The Liquidometer Corporation, Long Island City, N. Y., a corporation of Delaware Application July 30, 1948, Serial No. 41,488

5 Claims. (Cl. 73—317)

This invention pertains to a gauge for indicating the liquid contents of a container or tank by means of a float riding on the liquid in the tank. An object of the invention is to incorporate in the instrument a thermal element which compensates for differences in temperature of the liquid, in order that the gauge may be graduated in units of weight, such as pounds or grams, instead of units of volume, such as gallons or litres.

The usefulness of this invention may readily be understood by considering a gasoline tank in an airplane which is exposed to widely varying temperatures. The gasoline in the tank will expand and contract, and its density will change accordingly. The volume of the liquid might vary widely, while the total power energy of the gasoline remains unchanged. It is therefore desirable to have the tank contents gauge indicate weight instead of volume, because only weight gives a true indication of the available energy in the tank.

In order to accomplish the above result this invention applies an automatic temperature compensation to the well known float and arm movement.

In summary, the apparatus of the present invention includes a liquid level sensing apparatus including a float arranged to float on the liquid in the container, an indicator which may be disposed on the tank or remote therefrom and connected thereto by suitable means, including for example conventional telemetric means as hereinafter more particularly set forth, and means including, but not restricted to, a mechanical train actuated by the float for operating the indicator. The present invention particularly provides certain novel features in this mechanical train, in that it includes a three-dimensional cam element, which is movable in two ways: (a) along a predetermined axis, specifically in response to the movement of the float-carrying arm and preferably, as particularly disclosed, by preventing relative rotation between this cam and the arm, and (b) a bodily movement, which in this case is a movement axially of the axis of rotation of the cam, which is made responsive to the temperature of the liquid, specifically by providing a closed system for containing a thermally expansible fluid, having a chamber-forming portion subject to the temperature of the liquid, and as specifically herein illustrated, also having a duct from this portion to an expansible bellows positioned near the inner end of the float arm. The free end of this bellows is connected by a suitable mechanical linkage to move the cam axially. The cam follower is arranged to operate the indicator either directly or through some suitable remote control system.

The present application is related to two copending applications of the same joint inventors: Serial Nos. 34,586 and 43,828 filed respectively June 23, 1948, and August 12, 1948, and also is related to a copending sole application of De Giers, one of the present inventors, Ser. No. 41,426, filed July 30, 1948. All these cases are owned in common with the present case. The lines of division between these cases are based upon the following principles:

(1) The present case and the two copending applications of the same inventors have priority in accordance with their respective filing dates. Thus, the present application is junior to application Ser. No. 34,586 and as a result does not contain any claims readable upon that earlier application.

(2) De Giers sole application aforesaid is junior to all the three joint applications aforesaid. However, in view of the different subject matter, none of the claims of the present application are readable upon the De Giers sole application.

Further and other objects and advantages will be apparent from the specification and claims, and from the accompanying drawings which illustrate what is now considered the preferred embodiment of the invention.

In the drawings:

Fig. 1 is a view partly in elevation and partly broken away and in vertical section of a tank incorporating the invention, with the float at mid-position and with its full and empty positions indicated in broken lines;

Fig. 2 is an enlarged fragmentary view principally in vertical section showing details of the indicator actuating devices in their positions when the float is at the bottom of the tank;

Fig. 3 is a view similar to Fig. 2 but with the parts in their positions when the float is horizontal and temperature is normal; and Fig. 4 is a fragmentary plan view of the apparatus of Fig. 3 showing details, some parts being shown in horizontal section.

Fig. 1 shows a container or tank 20 containing liquid 22, on the surface of which rests a hollow float 24 carried on the end of a tubular arm 26, fast in a fulcrum bracket 30, which is pivoted at 28 on the horizontal arm of support 32 which depends from the indicator 34 on the top of the tank, the support 32 being rigid with the tank 20.

As the float rises and falls with the liquid in the tank, the indicator is actuated in conventional manner by a vertical push rod 36 within support 32 (Figs. 2, 3 and 4).

If desired, the indicator 34 could be the transmitter element of a telemetric indicator system in accordance with the teachings contained in the patent to De Giers, one of the present inventors, No. 2,104,898, issued January 11, 1938. This patent discloses a mechanism which may be directly substituted for the indicator 34 and certain of the operating means therefor which are hereinafter disclosed. It is further contemplated that a transmitter as disclosed in De Giers Patent No. 2,104,898 could be used in a system as disclosed in either of the patents to Lingel, Nos. 2,391,057 and 2,391,058, both issued December 18, 1945.

The lower end of rod 36 is suitably articulated to and supported by the horizontal arm of a bell crank 38 pivoted at 40 on support 32. In the event that the rod 36 is guided for solely vertical motion, lost motion between it and the bell crank may be provided as shown by the slot in the horizontal arm of the bell crank. If, however, the rod 36 may move laterally as a link connection, this slot may be replaced by an ordinary pivotal connection.

The improvements which enable the device to give correct indications of weight, instead of volume, will now be described.

The hollow float 24 contains a thermometer bulb 42 curved around the lower interior float surface in order to be readily susceptible to changes of temperature of the tank liquid on which the float rests. Bulb 42 is connected to a bellows 44 in fulcrum bracket 30 by a capillary tube 46 passing through tubular float arm 26. The closed system including the bulb 42, the tube 46 and the bellows 44 may be filled with a suitable thermally expansible fluid.

Bellows 44 will therefore expand and contract lengthwise in accordance with the temperature of the tank liquid, and serves, as will now be explained, to modify the travel of push rod 36 in order that the indicator may give its readings in units of weight instead of volume.

Bellows 44 is fast, at one of its ends, to the inner end wall of fulcrum bracket 30 (Figs. 2, 3 and 4) and is provided at its other, free, end with a stem 48 which is connected by a vertical pivot pin 50 to, and between, the horizontal cross-wise arms of a bell crank 52 pivoted by a vertical pin 54 on brackets 56 secured as by screws 58 to a vertical side wall of fulcrum bracket 30. The terms "horizontal" and "vertical" as here used refer to the disposition of the parts as shown in their positions in Fig. 4.

The longitudinally extending arms of bell crank 52 are slotted as at 60 (Fig. 4) to receive the upper and lower ends of a generally vertical pin 62 fast in a cam member 64 slideable horizontally on two parallel rods 66 supported at their ends in the side walls of fulcrum bracket 30. The axes of float arm pivot 28 and pin 62 intersect, as indicated in Figs. 2 and 3.

It will be clear from the above that as bellows 44 expands and contracts lengthwise under control of the fluid in the system including the bulb 42 in the float, bell crank 52 will move the cam member 64 longitudinally on rods 66 in accordance with changes of temperature. Mounted on or integral with the cam member 64 is a three-dimensional control cam, which, if no correction for temperature were required would need only to be an arcuate cam surface having an edge 70. However, since that condition seldom occurs, it is necessary to provide the three-dimensional cam surface 72 which corrects the cam action as will appear.

Mounted in the lower horizontal part of support 32 is a cam follower in the form of a horizontal rod 74 having a conical point 76 held in contact with cam surface 72 by a spring 78, the rod being supported and guided by cross members 80, 82 of support 32.

When the tank is empty float 24 will be at the bottom of tank 20 and the parts in the fulcrum bracket 30 and lower part of support 32 will be positioned as shown in Fig. 2, with follower point 76 in contact with cam member 64 at the point where the irregular cam surface 72 joins a cylindrical portion thereof. Under these conditions the pointer of the indicator will be at zero.

If now the float 24 moves to a horizontal position, indicating a tank half-full, the parts will have reached the positions of Figs. 3 and 4. Not only has the cam member 64 been rotated to half-full position, but on account of the temperature of the liquid, as sensed by fluid in bulb 42 in float 24, bellows 44 has actuated bell crank 52 to push the cam member 64 and cam surface 72 horizontally (downwardly in Fig. 4), with point 76 moved accordingly to a resultant position, causing rod 36 to actuate the indicator to show the half-full weight of the tank contents. Thus, the single cam is actuated in one sense, i. e. axially of the pivot 28, by change of temperature of the liquid, and in the other sense, i. e. rotatably about the axis of the pin 28, the result being an indication of weight of the liquid.

It is to be understood that the invention is not limited to the specific embodiment herein illustrated and described but may be used in other ways without departure from its spirit as defined by the following claims.

We claim:

1. Apparatus for indicating the liquid contents of a container in units of weight, comprising a float arranged to float on the liquid in the container, an indicator, means including a mechanical train actuated by said float for operating said indicator; said mechanical train including a cam element having a three-dimensional cam surface thereon, a cam follower engaging said cam surface for actuating said indicator; means for moving said cam element about a predetermined axis, means for bodily moving said cam element, one of said cam element moving means being actuated by said float, means for containing a thermally expansible fluid including a chamber-forming portion arranged to be subjected to the temperature of the liquid in said container, so that the fluid in said chamber-forming portion will expand and contract in accordance with the temperature of said liquid, and means mechanically movable by and in accordance with the expansion and contraction of the thermally expansible fluid in said chamber-forming portion for actuating the other of said cam element moving means, so as to interpose a temperature correction into said mechanical train, so that said indicator may be calibrated in units of weight and give accurate indications thereof independently of variations in the volume of said liquid resulting from changes in its temperature.

2. Apparatus in accordance with claim 1, wherein the bodily movement of said cam element is a movement thereof in a direction longitudinal of said axis, wherein said cam element is rotated about said axis by vertical movement of said float responsive to different levels of the liquid in said container, and wherein said cam element is moved longitudinally of said axis in response to changes in the temperature of said liquid.

3. Apparatus for indicating the liquid contents of a container in units of weight, comprising a float arranged to float on the liquid in the container, an arm carrying said float adjacent to its outer end, means pivotally supporting an inner end portion of said arm for movement about a predetermined, substantially horizontal axis fixed with respect to said container, an indicator, means including a mechanical train actuated by said arm for operating said indicator; said mechanical train including a cam element having a three-dimensional cam surface thereon, a cam follower engaging said cam surface for actuating said indicator; means mounting said cam element for rotational movement about a predetermined axis and for bodily movement longitudinally of its axis of rotation, means interconnecting said arm with said cam element to rotate same cam element about its axis of rotation by movement of said arm as said float moves up and down with different levels of the liquid in said container, and temperature responsive means movable at least in part with said float and responsive to the temperature of the liquid in the container for moving said cam element in a direction longitudinal of its axis of rotation, so as to interpose a temperature correction into said mechanical train, so that said indicator may be calibrated in units of weight and give accurate indications thereof independently of variations in the volume of said liquid resulting from changes in its temperature.

4. Apparatus in accordance with claim 3, wherein the predetermined axis of rotation of said cam element is said horizontal axis about which said arm is rotatable in respect to said container, and wherein said means interconnecting said arm with said cam element comprises means for preventing relative rotation between said cam element and said arm.

5. Apparatus in accordance with claim 3, wherein said temperature responsive means comprises means forming a substantially closed system for containing a thermally expansible fluid, said system including a chamber-forming portion carried by said float and disposed in the lower portion thereof, so that fluid in said chamber-forming portion will be exposed to the temperature of the liquid in the container, a duct connected to the interior of said chamber-forming portion and extending along said arm, and a bellows mounted in said arm adjacent to the inner end thereof and having its interior connected to said duct, one end of said bellows being fixed in respect to said arm and the other end being free to move in accordance with the expansion and contraction of said fluid, and means mechanically responsive to the movement of said other end of said bellows for moving said cam element in a direction longitudinal of its axis of rotation.

CLARENCE A. DE GIERS.
ARTHUR WICKESSER.

REFERENCES CITED

The following references are of record in the file of this patent:

UNITED STATES PATENTS

| Number | Name | Date |
| --- | --- | --- |
| Re. 18,514 | Reeves | July 5, 1932 |
| 1,772,929 | De Giers | Aug. 12, 1930 |
| 1,791,489 | De Giers | Feb. 10, 1931 |
| 2,369,027 | De Giers | Feb. 6, 1945 |